US012384511B2

(12) United States Patent
Barsali et al.

(10) Patent No.: US 12,384,511 B2
(45) Date of Patent: Aug. 12, 2025

(54) COMPOSITE CORE STRUCTURES FOR AIRCRAFT

(71) Applicant: AIRBUS OPERATIONS LIMITED, Bristol (GB)

(72) Inventors: Guilherme Barsali, Bristol (GB); Dominique Chasteau, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 20 days.

(21) Appl. No.: 18/324,690

(22) Filed: May 26, 2023

(65) Prior Publication Data
US 2023/0382510 A1 Nov. 30, 2023

(30) Foreign Application Priority Data

May 26, 2022 (GB) .................................. 2207810

(51) Int. Cl.
*B32B 3/12* (2006.01)
*B32B 3/06* (2006.01)
(Continued)

(52) U.S. Cl.
CPC .................. *B64C 1/00* (2013.01); *B32B 3/06* (2013.01); *B32B 3/12* (2013.01); *B32B 5/02* (2013.01); *B32B 27/12* (2013.01); *B32B 27/38* (2013.01); *B32B 37/146* (2013.01); *B32B 37/185* (2013.01); *B64F 5/00* (2013.01); *B32B 2250/40* (2013.01); *B32B 2260/021* (2013.01); *B32B 2260/046* (2013.01); *B32B 2305/024* (2013.01);
(Continued)

(58) Field of Classification Search
CPC ....................................................... B32B 3/12
See application file for complete search history.

(56) References Cited

U.S. PATENT DOCUMENTS 4,149,522 A * 4/1979 Keeling ................ F24S 10/503
126/648
4,578,303 A * 3/1986 Kundinger ................ B32B 3/12
428/912.2
(Continued)

OTHER PUBLICATIONS

Wang, R.; Wang, J.; "Analysis of In-Plane Compression and Bending of Honeycombs with Laminated Cell Walls", Proceedings of the ASME 2015 International Mechanical Engineering Congress and Exposition IMECE2015, 2015, p. 1-10.*

(Continued)

*Primary Examiner* — Humera N. Sheikh
*Assistant Examiner* — Julia L Rummel
(74) *Attorney, Agent, or Firm* — Nixon & Vanderhye P.C.

(57) ABSTRACT

A core structure (300) for a composite panel for an aircraft, for example a door fairing for a landing gear bay, including a sandwich structure in which core cells (301) are sandwiched between first and second body sides (skins 303, 305). The core cells are square or rectangular in shape and each have a void formed by cell walls (307). The first and second body sides and the cell walls include laminated composite material of multiple layers. Drainage holes (320) in the cell walls form one or more direct drainage paths (P2, P3) for the flow of fluid from the core structure. The core cells include first and second sheets of cells reversibly mounted to each other, such that the void of each cell is formed in part by the first sheet and in part by the second sheet.

20 Claims, 10 Drawing Sheets

(51) Int. Cl.
*B32B 5/02* (2006.01)
*B32B 27/12* (2006.01)
*B32B 27/38* (2006.01)
*B32B 37/14* (2006.01)
*B32B 37/18* (2006.01)
*B64C 1/00* (2006.01)
*B64F 5/00* (2017.01)

(52) U.S. Cl.
CPC ... *B32B 2307/7375* (2023.05); *B32B 2605/18* (2013.01); *B32B 2607/00* (2013.01); *B64C 2001/0072* (2013.01)

(56) References Cited

U.S. PATENT DOCUMENTS

| | | | |
|---|---|---|---|
| 2004/0126537 | A1 | 7/2004 | Jackson et al. |
| 2010/0155603 | A1* | 6/2010 | Ferreira Dos Santos .................... G01N 22/04 250/341.6 |
| 2018/0166058 | A1* | 6/2018 | Delehouze .............. F02K 1/827 |
| 2020/0307135 | A1* | 10/2020 | Wilde ................ B29D 99/0021 |

OTHER PUBLICATIONS

Combined Search and Examination Report for GB2207810.9 dated Nov. 23, 2022, 5 pages.

* cited by examiner

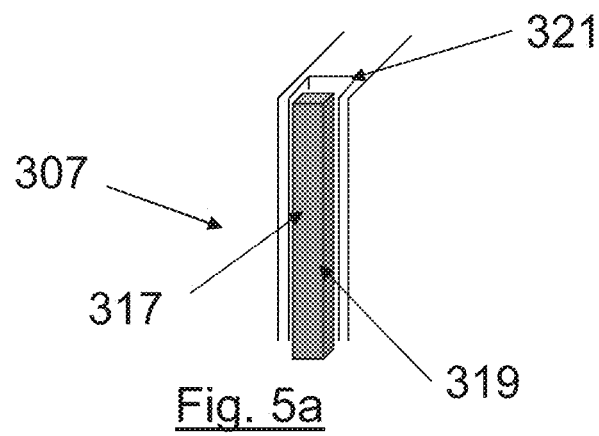
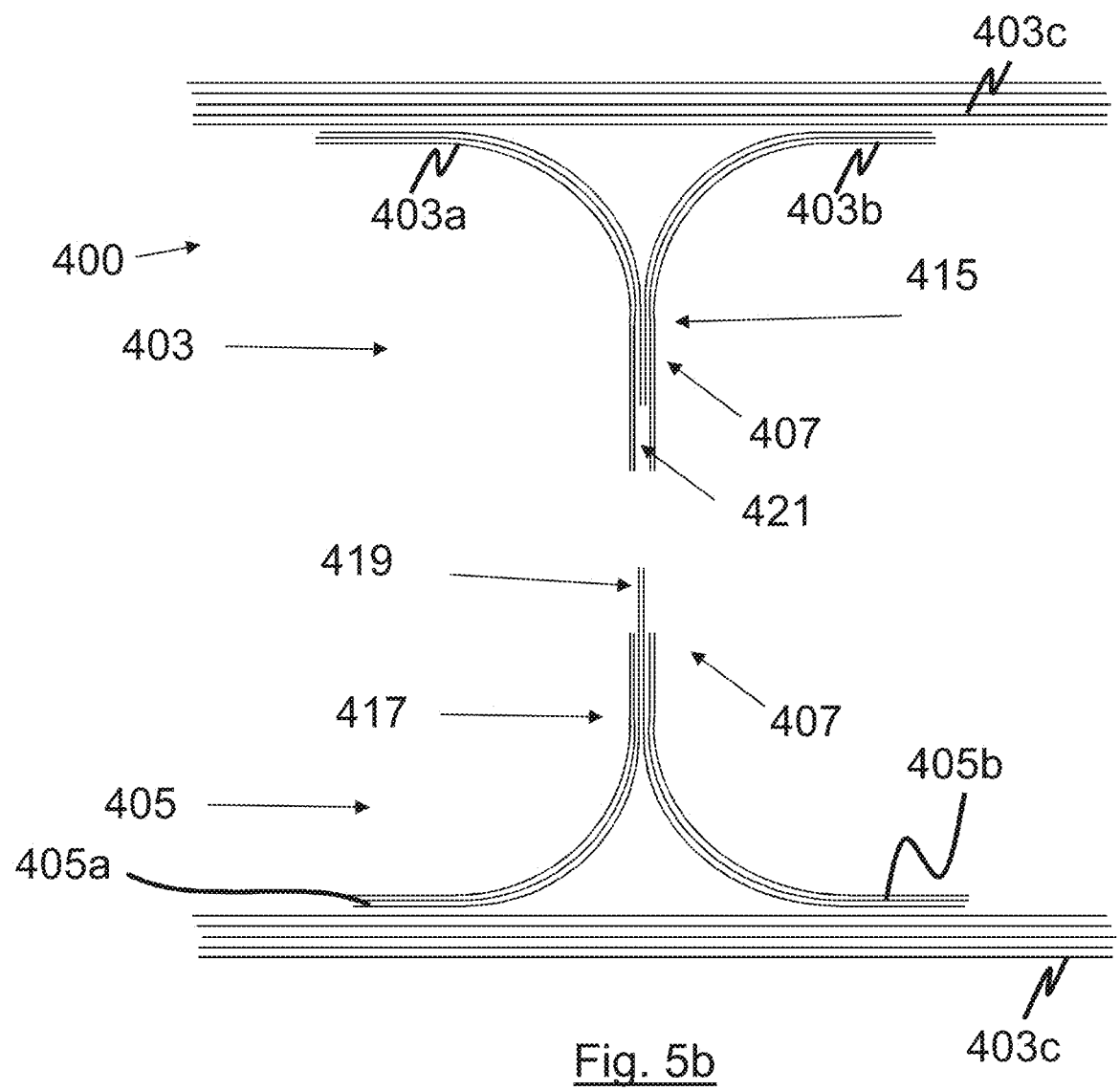

COMPOSITE CORE STRUCTURES FOR AIRCRAFT

RELATED APPLICATION

This application incorporates by reference and claims priority to United Kingdom patent application GB 2207810.9, filed May 26, 2022.

BACKGROUND

The present invention concerns composite core structures suitable for use in aircraft. Composite core structures are also known as composite "sandwich" structures, and for the purposes of this application the terms are considered interchangeable.

More particularly, but not exclusively, this invention concerns core structures, methods of forming core structures, panels for aircraft comprising core structures and aircraft and aircraft sub-structures comprising said panels.

Aircraft landing gear assemblies are some of the most complex components of an aircraft, as they combine several different functions including suspension/shock absorption, braking, steering, and ground clearance. The main landing gear door and fairings around the landing gear (e.g. belly fairings) must perform well under all flight conditions and in a variety of scenarios such as failure of the ability of the main landing gear door to close, inadvertent deployment of the main landing gear uplock, and the high lateral airflows that the door is exposed to when it is fully open. These doors and fairings are often made of composite core structures.

Adding to the above complexity, the various attachment points, and the kinematics of the various parts of the landing gear assembly as it moves between retracted and extended positions, impose further design requirements such as tight tolerances on positions of parts, attachment points, and the like and also precise motion paths. Thus, both the design and installation of landing gear door and fairings must accommodate such tight tolerances and precise motion paths as so required of the landing gear assembly. This can often lead to inefficiencies and technical difficulties during assembly of a new aircraft, especially as the composite core structures used in the manufacture of main landing gear doors and fairings are usually formed at least in part using time-consuming, skilled, and manual labour intensive lay-up processes. Moreover, once a panel is made, it is often difficult to reshape or otherwise modify the panel without undermining the structural integrity of the panel. Manufacture of the components of the landing gear assembly that are made out of composites to the required tolerances is therefore difficult and often results in significant waste during manufacture.

In the case of composite core structures used in the manufacture of landing gear bay doors, particularly those that travel with the landing gear when deploying, it may be desirable to build in pre-stress into the structure, so that it adopts a target shape when in use, particularly when the landing gear is in its stowed position and the door is closed over the landing gear bay. The structure may need to have a bending stiffness and a torsional stiffness that meets certain criteria (minimum and/or maximum values for example). Such requirements may further complicate manufacturing processes.

Furthermore, the complexity described above also applies to other moving parts on an aircraft that are routinely manufactured from composite core structures. Again, for these structures, the manufacturing process of the core structure in combination with the extremely tight tolerances required by present aircraft part designs means that significant waste and costs may be incurred in the manufacture of these parts. Therefore, there is a desire to design core structures that are easier to manufacture and/or have structural properties that allow for their use in scenarios with less severe tolerance constraints. Alternatively or additionally, there may be a desire to keep similar manufacturing tolerances of known, state of the art methods of manufacturing, while forgoing the need to make adjustments during assembly, which are presently required in order to achieve the desired tolerances (e.g. peelable shims for radial adjustments and washers for axial adjustments).

Moreover, it is well known that moisture can enter inside core structures during use (for example though a fastener hole). This moisture freezes in flight, where the altitude is higher, and melts at lower altitudes (for example, at ground level). Over a number of flight cycles, this can cause a so-called "freeze-thaw" effect, which may result in a decrease in structural integrity and cause damage to the core structure. There is therefore a desire to design core structures that more efficiently withstand such freeze-thaw effects.

The present invention seeks to mitigate one or more of the above-mentioned problems. Alternatively or additionally, the present invention seeks to provide an improved core structure.

SUMMARY OF THE INVENTION

The present invention provides according to a first aspect, a core structure for a composite panel for an aircraft. The core structure comprises a first body side, a second body side, and a plurality of core cells extending between the first body side and the second body side. The first body side and the second body side are typically generally aligned with each other. Each body side need not necessarily be perfectly flat, nor necessarily perfectly parallel to each other. Complicated curved geometries may be required in applications on an aircraft. The cells may each have a cell axis, defined as an axis which is perpendicular to one or both of the surface of the first body side and second body side local to the cell. Each one of the plurality of core cells comprises at least one cell wall and a void surrounded by the at least one cell wall. The at least one cell wall typically extends parallel to the cell axis.

In certain embodiments, each one of the plurality of core cells comprises at least one drainage hole in the at least one cell wall. Multiple drainage holes together form a drainage path through the core structure via a plurality of the core cells. The drainage path may extend parallel to the first body side and/or to the second body side. The drainage holes may form a direct drainage path across the core structure, said drainage path being configured to allow fluid to drain from the core structure.

Embodiments of the first aspect of the invention may thus provide a drainage path that facilitates water to quickly and efficiently leave the core structure. This reduces the likelihood of de-bonding, delamination or other damage been inflicted to the core structure as a result of "freeze-thaw" cycles that occur as moisture that enters the panel (through, for example, fastener holes) is frozen at high altitude, and then thaws at low altitude. This repeated "freeze-thaw" effect over a number of cycles causes repeated contraction and expansion of water, which exerts cyclical forces throughout the core structure. Having the water drain more efficiently through the core structure reduces the amount of water that gets trapped in the panel and expands and contracts under freeze thaw cycles, and thus reduces the internal stress placed upon the core structure. This improves the long term structural integrity of the core structure such that fewer repairs and replacements are needed to the core structure in use. This improves the cost and environment performance of the core structure. The drainage path may run substantially parallel to the planes of the first body side and second body side. The drainage path may terminate at an edge of the core structure.

The plurality of core cells may be arranged to be aligned such that the drainage path formed by the plurality of core cells is linear. This helps to reduce the length of the path needed for any moisture to drain from the panels, and therefore improves the ability of the panel to drain any water within the structure of the panel further still. A straight drainage path may reduce the risk of moisture pooling within the panel. There may be a further drainage path. The further drainage path may be orthogonal to the (aforementioned) drainage path.

The drainage path may have a path length, which is less than 125% (optionally less than 110%) of the shortest distance from the start of the drainage path to the end of the drainage path as measured parallel to at least one of the first body side and the second body side. The drainage path may have a path length, which is substantially the same as (e.g. within 5% of) the shortest distance from the start of the drainage path to the end of the drainage path as measured parallel to at least one of the first body side and the second body side. The drainage path may have a path length, which is substantially the same as the length or width of the core structure. The drainage path may be aligned with the length or width of the core structure. There may be one or more further drainage paths. One or more such further drainage paths may be parallel to each other. There may be one or more further drainage paths which extend in a direction which is transverse to the direction of another drainage path, for example perpendicular thereto. For example, one drainage path may extend in a direction along the width of the core structure and a further drainage path may extend in a direction along the length of the core structure. In embodiments, it may be that the (first-mentioned) drainage path is aligned with one of the length or width of the core structure and a further drainage path is aligned orthogonally to the (first-mentioned) drainage path. Having drainage paths that extend in different directions can allow moisture to escape from within the core structure, irrespective of the orientation of the core structure during use. It will be appreciated that the one or more further drainage paths may each have one or more, or all, of the features required of the (first-mentioned) drainage path (e.g. being required to pass through the plurality of core cells and across the core structure).

In a substantially rectangular- or square-celled composite core structure, having an arrangement in which the drainage path has a length that is the same as the length or width of the core structure can provide the shortest possible path for moisture to follow to drain from the core structure. It will be understood that arrangements in which the core cells are configured to provide a linear drainage path will typically have voids/cell shapes that are not hexagonal. Core structures made from hexagonal cells are common in many applications as a result of the efficient use of mass for desired mechanical properties. Utilising a non-hexagonal cell shape provides significant other advantages however, particularly in relation to drainage arrangements, but possibly also in relation to applications where the bending/twisting strength and or flexibility of the core structure about certain axes is to be controlled, in a manner that would be more difficult when using a hexagonal cell structure.

The at least one cell wall may include four cell walls, said cell walls being arranged to form a prism having a quadrilateral base. The quadrilateral prism may have a base having a shape selected from any of the following shapes: a square, a rectangle, or a rhombus. The shape of the base of the prism for each of the plurality of core cells may be different, such that the at least one cell wall a first cell is square, while the at least one cell wall a second, adjacent cell is a rhombus, for example. Alternatively, the cell walls may be arranged to form a prism having a hexagonal base. Alternatively, the cell walls may be arranged to form a prism having a triangular base.

An embodiment of the present invention may be in the form of a core structure for a composite panel for an aircraft, the core structure comprising a first body side, a second body side, and a plurality of core cells extending between the first body side and the second body side, wherein each core cell is defined in part by four cell walls being arranged to form a prism having a quadrilateral base (the base for example having an area of between 2,000 mm$^2$ and 400,000 mm$^2$).

As mentioned above, each core cell has a cell axis and extends between the first body side and the second body side of the core structure. The cell axis extends in a direction which is perpendicular to the first body side and second body side. It is possible for the first body side and/or the second body side to be non-planar, although it is unlikely for any curvature to deviate very significantly from a generally flat or gently curved surface. As such one or more cell axes need not be perfectly parallel to all other cell axes. The height of a cell is measured parallel to the cell axis. The cell may have a length and a width. The length and width of the cell are typically measured in orthogonal directions each being perpendicular to the cell axis. The length of the cell may be the longest dimension of the cell as measured in a direction which is perpendicular to the cell axis. Alternatively, or additionally, the length of the cell may be measured in a direction which is parallel to the length of the core structure. The width may be measured in a direction which is both perpendicular to the cell axis and perpendicular to the length. It may be that the length of the cell is equal to the width of the cell. The internal length or width of a cell may be measured as the length or width of the void within the cell (i.e. so that the thickness of the cell wall does not contribute to the measured dimension).

At least one of the cell walls of each of the plurality of core cells may have a length greater than 10 mm. The length of the cell wall may be measured as the internal length. At least one of the cell walls of each of the plurality of core cells may have a length greater than 40 mm, greater than 60 mm, or greater than 80 mm, or the length is in a range of 10 mm to 200 mm, 25 mm to 150 mm or 35 mm to 100 mm. The void may extend at least 10 mm, 30 mm or 50 mm in a direction perpendicular to the cell axis or in a range of 10 mm to 200 mm, 25 mm to 150 mm or 35 mm to 100 mm in a direction perpendicular to the cell axis. In some embodiments, the void may be as large as 500 mm in a direction perpendicular to the cell axis The void of each cell may thus be relatively large (e.g. having an area—as measured perpendicular to the cell axis—of greater than 2,000 mm$^2$ and possibly up 200,000 mm$^2$, optionally up to 400,000 mm$^2$).

Having large voids may allow for different, and more desirable, mechanical properties than smaller void arrangements. Larger drainage holes may be provided if the cell voids themselves are larger. Larger drainage holes provide for better and/or more efficient drainage. While the cell walls of each cell may be longer than 40 mm for these reasons, and others, there may be embodiments of the invention in which the length is less than 10 mm.

At least one of the at least one of the cell walls of each of the plurality of core cells may have a thickness greater than 3 mm or 10 mm. or in a thickness range of 3 mm to 25 mm or 6 mm to 12 mm. Having a relatively thicker cell wall, allows for larger voids while retaining the mechanical properties so desired.

The plurality of core cells may comprise a laminated composite material.

The plurality of core cells may comprise composites formed from material formed of pre-impregnated material ("pre-preg"). Use of pre-preg material reduces the likelihood of an error occurring and moreover reduces the waste generated during the fabrication of the core structure, when compared to wet lay-up. Optionally, the plurality of core cells comprise composites formed of laminates formed from dry fabric and wet lay-up resin.

The cell walls comprise laminated composite material may comprise a plurality of layers, for example wherein said layers are aligned with the cell axis and/or stacked across the thickness of the wall. Forming the cell walls from laminate material in this way allows for controlled loading of the core structure, with forces being reacted perpendicular to the direction in which the layers are stacked. Having larger voids may require thicker and/or stronger cell walls, in order to provide desired mechanical properties of the core structure. The use of laminated composite material for the cell walls in embodiments, enables the mechanical properties desired of the cell walls with efficient use of mass.

The laminated composite material may comprise at least 3 layers. The laminated composite material comprises at least 5 layers, at least 10 layers or in a range of 4 layers to 7 layers.

The plurality of core cells may comprise a material formed of aromatic polyamide-aramid-fibres, for example such as Nomex®. The plurality of core cells may comprise a material formed of carbon-reinforced polymer material. The plurality of core cells comprise a material formed of glass-reinforced polymer material. The plurality of core cells may comprise basalt. Optionally, the core cells comprise a material selected from the following: glass fibres, glass cloth, basalt fibres, carbon fibres and/or aramid fibres.

The plurality of core cells may comprise epoxy resin. Optionally the plurality of core cells comprise any other thermoset or thermoplastic polymers suitable for use as matrix material in composites, such as polyester, vinyl ester, or nylon.

The first body side and second body side may comprise a laminated composite material.

The first body side and second body side may be composites formed from pre-impregnated laminates or laminates formed from dry fabric and wet lay-up resin. The first body side and second body side may be composites formed from dry fabric that undergone resin transfer moulding. The first body side and second body side may be composites formed from pre-preg material that has been layed-up using automated tape laying. Alternatively or additionally, the first body side and second body side are composites formed from pre-preg material using fibre placement techniques such as automated fibre placement (AFP) methods.

The laminated composite material may comprise at least 3 layers; at least 5 layers or at least 10 layers. The laminated composite material may comprise between 4 layers and 7 layers.

It may be that at least one of the layers (e.g. plies) of composite material forming a layer (including a partial layer) of one of the first body side and second body side also forms a layer in at least part of a cell wall. Such a layer be thus include an elbow portion, having curvature that allows transition of the layer between a first region of it when parallel to the first/second body side and a second region when parallel to the cell wall.

The first body side and second body side may comprise a material formed of aromatic polyamide-aramid-fibres, for example such as Nomex®. The first body side and second body side may comprise a material formed of carbon-reinforced polymer material. The plurality of core cells comprise a material formed of glass-reinforced polymer material. The first body side and second body side may comprise basalt. Optionally, the first body side and second body side comprise a material selected from the following: glass fibres, glass cloth, basalt fibres, carbon fibres and/or aramid fibres.

The first body side and second body side may comprise epoxy resin. Optionally the first body side and second body side comprise any other thermoset or thermoplastic polymers suitable for use as matrix material in composites, such as polyester, vinyl ester, or nylon.

The first body side and second body side may comprise the material used to form the core structure. This simplifies the manufacturing process as it makes it easier for the first body side and second body side to be co-cured with the plurality of core cells. Alternatively or additionally, each of the first body side and second body side are tool-side faces, which optionally form a closed mould. This naturally gives a smooth surface to each of the first body side and second body side, and better metrological control over the interface between the first and second body sides and the plurality of core cells.

The height of the core structure along the cell axis may be in a range of 50 to 250 mm. The height of the core structure along the cell axis may be in a range of 150 to 200 mm. Of course the skilled person would understand that the core structure may have any other suitable dimensions for a composite panel, particularly for a composite panel for use on an aircraft, and in particular for use as a door or fairing of an aircraft landing gear assembly. The length and width of the core structure (which may in turn be defined by the directions in which the cell walls extend) need not necessarily be aligned with the length and width of the panel. A core structure of an embodiment, for example one suited for use as a door fairing panel, may have a thickness of between 150 mm and 250 mm and a surface area (a measure of the size of the first body side and/or second body side) of between 0.1 m$^2$ and 7.5 m$^2$, or at least 0.5 m$^2$, or at least 1 m$^2$. The area may be 10 m$^2$ or less, 8 m$^2$ or less, or 5 m$^2$ or less.

The plurality of core cells may comprise a first sheet of cells and a second sheet of cells, the first sheet of cells and second sheet of cells being reversibly mountable to each-other—for example along the cell axis such that they can be stacked on top of each other along the cell axis. By 'stacked' the skilled person will appreciate that this means that the first and second sheet of cells are reversibly mounted (i.e. reversible joined) along their faces (i.e. face to face). The void of each cell may thus be formed in part by a first sheet of partial cells and in part by a second sheet of partial cells. The first sheet of cell and second sheet of cells may be substantially symmetrical to each other with respect to the mean longitudinal plane through the core structure. Alternatively or additionally, the first sheet of cell and second sheet of cells may be substantially symmetrical to each other around their faces (where they are reversibly mounted).

The first sheet of cells and second sheet of cells may comprise a male-female connector configured to enable the sheets to be reversibly mounted to each-other. The male connector may be a notch in the second sheet of cells and the female connector is a recess or detent in the first sheet of cells. The notch and/or the recess may be covered in an adhesive.

The male-female connector may be configured such that the first and second sheets are reversibly mounted to each other via a push-fit configuration. It may be that one sheet is associated only with the male part(s) of the male-female connector, and the other sheet being associated only with the female part(s) of the male-female connector.

In embodiments, forming the core structure in two halves that are joined in the manner described above can assist in manufacturing of cell walls formed of laminate composite materials.

It will be appreciated that various features of the first aspect of the invention may have application independently of the arrangement and configuration of a direct, straight and/or linear, drainage path. There may be embodiments of the invention for example that utilise one or more of the following, potentially advantageous features: non-hexagonal, rectangular cells, cells with large voids, cells which have walls that are made from laminated composite material, a core structure panel being formed from two halves such as with male/female connections. Such further aspects are briefly set out below together with yet further aspects of the invention associated with the manufacture and/or design of such core structures.

According to a second aspect of the invention there is provided a core structure for a composite panel for an aircraft, the core structure comprising: a first body side, a second body side, and a plurality of core cells extending between the first body side and the second body side, wherein each core cell having a cell axis extending in a direction from the first body side to the second body side and a void which extends at least 10 mm in a direction perpendicular to the cell axis.

According to a third aspect of the invention there is provided a core structure for a composite panel for an aircraft, the core structure comprising: a first body side, a second body side, and a plurality of core cells extending between the first body side and the second body side, wherein each core cell is defined by at least one cell wall comprising laminated composite material (for example with the layers of the laminated material being stacked across the cell wall thickness).

According to a fourth aspect of the invention there is provided a core structure for a composite panel for an aircraft, the core structure comprising: a first body side, a second body side, and a plurality of core cells extending between the first body side and the second body side, wherein each of the cells are formed in part by a first sheet and in part by a second sheet, the first and second sheets being joined together, for example by a male to female connection.

It will be appreciated that each of the second, third and fourth aspects of the invention may comprise any of the features previously described in relation to the first aspect of the invention.

According to a fifth aspect of the invention there is provided a method of forming a core structure, for example being in accordance with any of the first to fourth aspects of the invention. Such a method may for example comprise a step of providing the first body side and the second body side. The method may include bonding the first body side and second body side together such that the plurality of core cells are fixed between the first body side and second body side.

At least part of this method may occur using out of autoclave technology. The bonding may use adhesive placed between the first body side and plurality of core cells, and the second body side and the material which forms the plurality of core cells. An advantage of this method is that the skins and the core can be cured separately (or otherwise manufactured, for example if the core is not a laminated material) before assembly of the core structure.

The method of the fifth aspect of the invention may be in the form of a method of forming a core structure, for example one being in accordance with any of the first to fourth aspects of the invention, the method comprising the steps of:

positioning a mould on a first body side in order to form a lay-up surface;

positioning layers of uncured material on said lay-up surface such that at least part of the uncured material interfaces with the first body side, and curing the material positioned on the lay-up surface in order to form a plurality of core cells, or part cells, and to bond them to the first body side. There may be a step of bonding a second body side to the plurality of cells.

The step of curing the material positioned on the lay-up surface in order to form a plurality of cells may form a first sheet of cells (e.g. part cells). There may be a step of forming a second sheet of (partial) cells for joining to the first sheet in order to form the plurality of core-cells. There may be a step of positioning a mould on a second body side in order to form a second lay-up surface and then positioning layers of uncured material on said second lay-up surface such that at least part of the uncured material interfaces with the second body side. There may be a step of curing the material positioned on the second lay-up surface in order to form the second sheet of cells and to bond them to the second body side. There may be a step of joining the first and second sheets of cells together to form the core structure (the performance of which step thus perform the step of bonding the first body side to the second body side together. There may be a step of removing the mould in advance of the step of bonding the first body side and second body side together to form the core cells therebetween. There may be a step of "peeling" or otherwise disrupting the lay-up of the first and/or second body side in order to form the cell wall of the core cells. Thus, the cell walls may be formed of bent layers of the first and/or second body side. The peeling step may take place before the first body side and second body side are bonded together to form core cells there-between.

The uncured material may be co-cured with the first body side and second body side during the curing step. The uncured material from which the plurality of core cells is to be formed of, may be co-cured with the (previously uncured) first body side and second body side. This allows for the bonding to occur without any additional adhesive layers, which improves the structural performance of the core structure.

The first and second sheet may be joined by push-fit. Makes assembly of the first and second sheet easier before the final curing step and/or final bonding step of the core structure.

The method of a further aspect of the invention comprises a method of forming a core structure comprising the steps of positioning a mould on a first body side in order to form a lay-up surface, positioning layers of uncured material on said lay-up surface such that at least part of the uncured material interfaces with the first body side, curing the material positioned on the lay-up surface in order to form the plurality of core cells and to bond them to the first body side, and bonding a second body side to the plurality of core cells.

According to a further aspect of the invention there is provided a method of forming a core structure, the method comprising the steps of positioning layers of uncured material on a first lay-up surface such that at least part of the uncured material interfaces with a first body side to form a first sheet of cells, positioning layers of uncured material on a second lay-up surface such that at least part of the uncured material interfaces with a second body side to form a second sheet of cells, and co-bonding the first and second sheets of cells together to form the core structure.

The first and/or second body side may be provided as a plurality of plies of an uncured composite, and the method comprises the step of bending (for example peeling) some of the plies of the first and/or second body side in order to place the uncured material into the shape of the first sheet of cells and/or second sheet of cells.

The method may comprise the steps of curing the first sheet of cells and/or the second sheet of cells prior to the step of co-bonding the first and second sheets of cells together to form the core structure. The curing of the first sheet of cells and/or the second sheet of cells may occur in a first curing cycle and the co-bonding the first and second sheets of cells together to form the core structure may occur in a second curing cycle.

According to a seventh aspect of the invention there is a provided a method of designing, and then forming, a core structure according to any of the first to fourth aspects of the invention. Such a method may comprise selecting a cell size and cell wall properties in order to produce a core structure having a desired bending stiffness about at least one axis and a desired torsional stiffness about at least one axis. Such a method may comprise receiving parameters defining, or proving limits on, the desired bending stiffness and the desired torsional stiffness. The method may include calculating such parameters. The particular structural features of and variables provided for by the core structure according to the first to fourth aspects of the invention are well suited to enabling such a design method. There may be a step of selecting a number of layers of material for forming a laminated composite material cell wall for example. It may be that the desired bending stiffness substantially the same as conventional composite core structures known in the art. It may be that the desired torsional stiffness, or range thereof, is less than that of conventional composite core structures known in the art—thus allowing a certain amount of torsional flexibility.

The method may comprise a step of selecting the number of layers that form the laminated composite material of the plurality of core cells such that the core structure has a bending stiffness substantially the same as conventional composite core structures known in the art and torsional stiffness less than that of conventional composite core structures known in the art.

According to an eighth aspect of the invention there is provided a structural panel for an aircraft comprising the panel of any of the first to fourth aspects of the invention or a panel formed by the method of any of the fifth to seventh aspects of the invention.

The structural panel may be a door of a landing gear bay. The door may be one which is attached to a landing gear (e.g. main landing gear) of the aircraft. A panel for such a door may be simpler and easier to manufacture utilising embodiments of the present invention. Its mechanical properties (bending stiffness and torsional stiffness) can readily be designed so that no flushing adjustments are needed during assembly—the door being able to reliably close without such adjustments, as a result of the desired low torsional stiffness to bending stiffness ratio being provided by the panel.

The structural panel may have a bending stiffness substantially the same as conventional composite structural panels known in the art. and a torsional stiffness of less than that of conventional composite structural panels known in the art.

According to a ninth aspect of the invention there is provided a sub-assembly of an aircraft, such as a main landing gear sub-assembly of an aircraft, comprising a structural panel according to the eighth aspect of the invention.

According to a tenth aspect of the invention there is provided an aircraft comprising a structural panel according to the eighth aspect of the invention or a subassembly according to the ninth aspect of the invention.

The aircraft may be a passenger aircraft. The passenger aircraft may comprise a passenger cabin comprising a plurality of rows and columns of seat units for accommodating a multiplicity of passengers. The aircraft may have a capacity of at least 20, more than at least 50 passengers, and more than 50 passengers. The aircraft may be a commercial aircraft, for example a commercial passenger aircraft, for example a single aisle or twin aisle aircraft.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 5a shows a close up of the cell wall at an interface (in this case rotated 90° for clarity) between the first half and second half of the core structure;

FIG. 5b shows a close up of the cell wall of a core structure 400 of a further embodiment of the invention where the cell walls are formed of bent plies of first and second skin.

DETAILED DESCRIPTION

Figure 1:
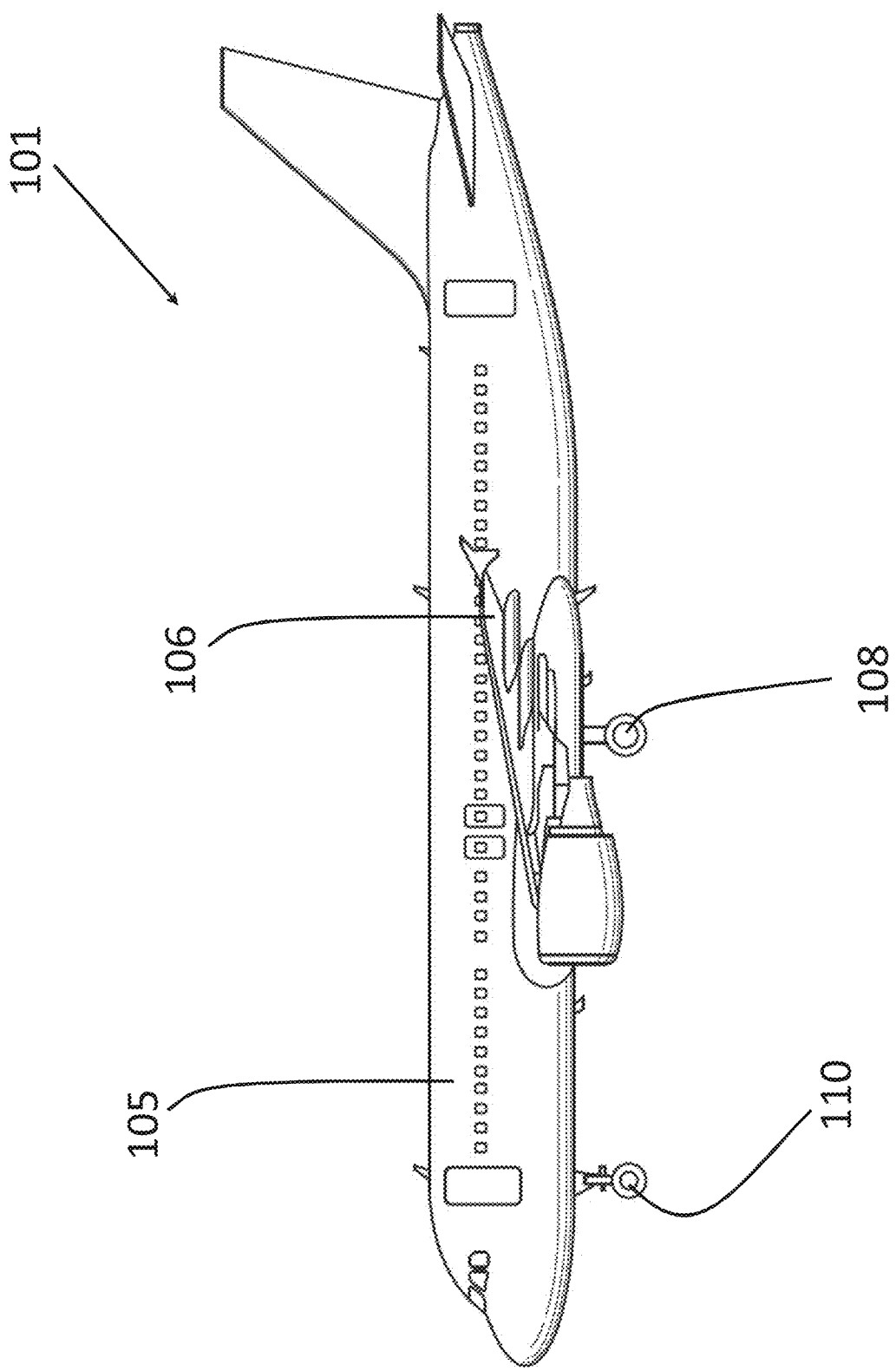
FIG. 1 shows an aircraft, having landing gear assemblies wherein said aircraft and aircraft assemblies being suitable for use with the core assemblies of the present invention.

FIG. 1 shows an aircraft 101 comprising a pair of wings 106 and a fuselage 105. The aircraft is supported on the ground by sets of landing gear assemblies comprising main landing gear assemblies (MLG) 108 and a nose landing gear assembly (NLG) 110. The MLG 108 has a main door (not shown), that is made of a core structure.

Figure 2A:
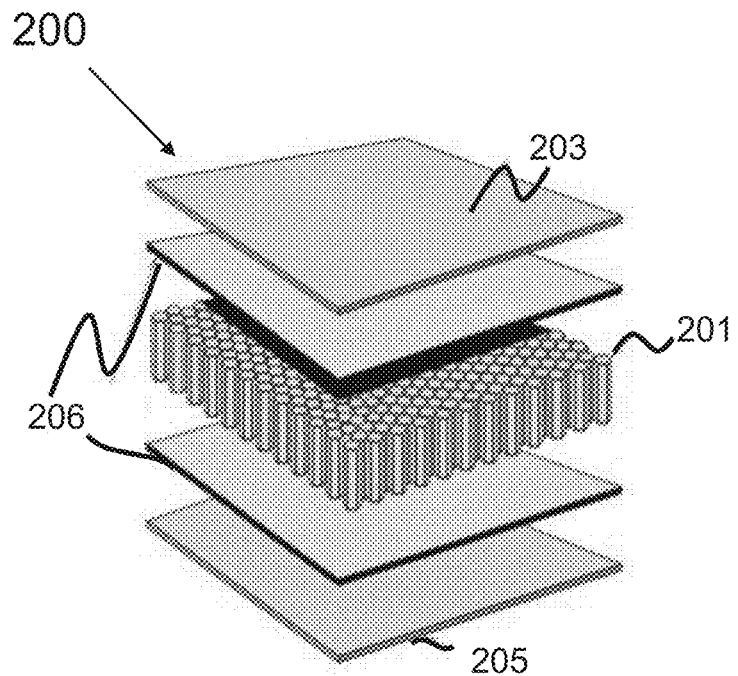
FIG. 2a shows a core structure according to a first embodiment of the invention.
Figure 2B:
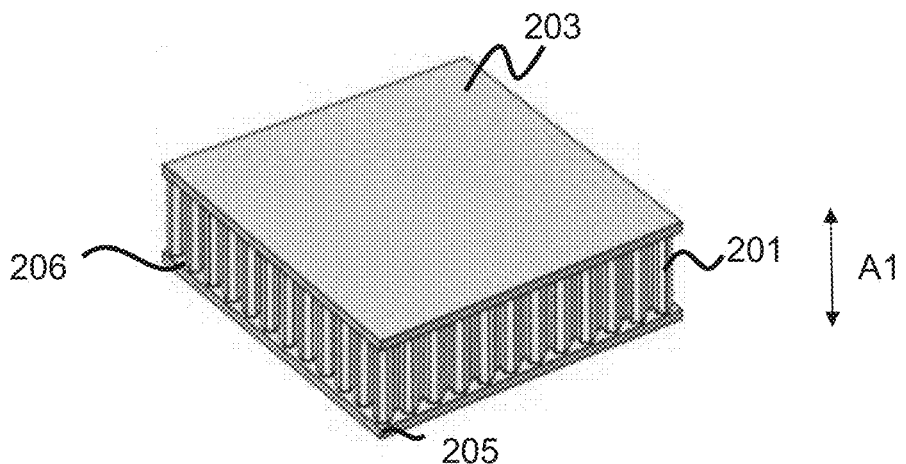
FIG. 2b shows a core structure of the first embodiment of the invention after it has been fully bonded together.

FIG. 2a shows a core structure according to a first embodiment of the invention. The core structure 200 consists of a plurality of hexagonal prism-shaped cells 201. The hexagonal walls that make up the cells of the core structure 200 are made of laminated fibre reinforced composite. The fibre-reinforced composite was made using pre-preg sheets of material, said sheets comprising carbon fibre and pre-impregnated with epoxy resin. The cells have a cell size of 42 mm (as measured from the mid-plane of one cell wall forming one side of the hexagon when seen in plan view to the mid-plane of the opposing cell wall that forms the opposite side of the hexagon). The cell size may be considered as being equivalent to its length in this embodiment. Bonded to each side of the core structure 200 by adhesive layers 206 are a first skin 203 and a second skin 205. The fibre reinforced composite, and thus the cell walls 207 (shown in FIG. 2C) has a thickness of 10 mm, the fibre reinforced composite comprising 5 layers of carbon fibre bonded on top of each other (not shown) in order to build up the hexagonal prism shaped cells 201. The core structure of laminate material is formed and cured; the first skin 201 and second skin 205 are cured separately, before being bonded to the core 201 by the use of the adhesive layers 206. The first skin 203 and second skin 205 are formed of a different fibre reinforced composite (glass fibre based reinforced composite) compared to the fibre reinforced composite used for the plurality of core cells (carbon-fibre based reinforced composite). FIG. 2b shows a core structure of the first embodiment of the invention after it has been fully bonded together. The height of the core structure along the cell axis A1 is 150 mm.

Figure 2C:
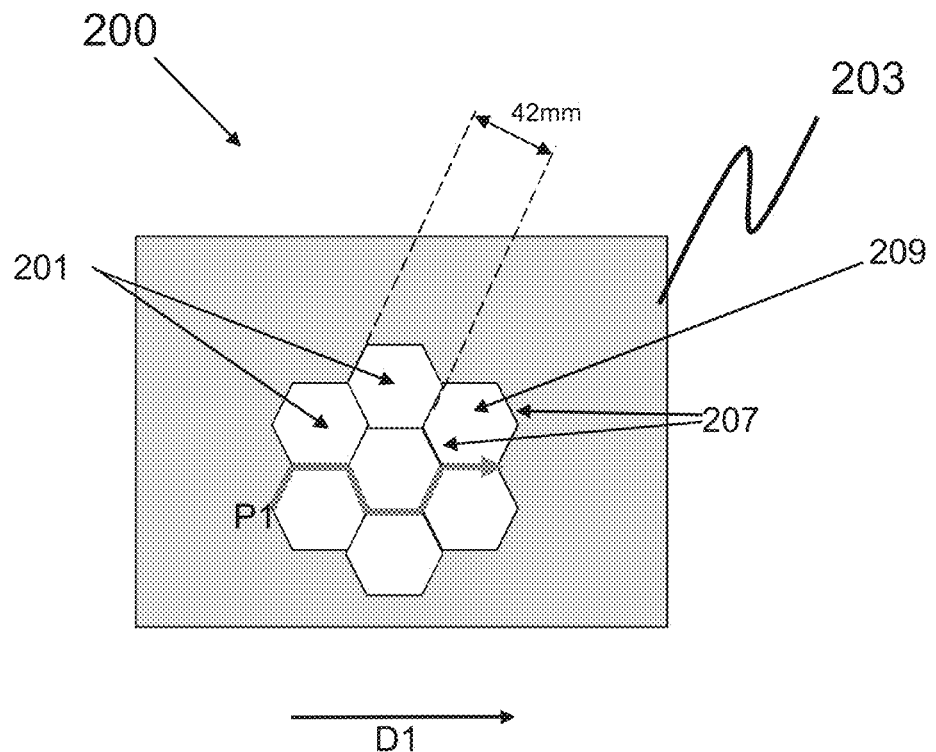
FIG. 2c shows a plan view of the core structure of the core structure of the first embodiment of the invention, where the first skin is transparent to allow the cell walls to be viewed.

The cell walls 207 are shown in FIG. 2c. Drain holes (not shown) are intermittently present along the base of the cell walls 207 between the cell walls and the first skin 203. These drain holes allow moisture to escape the panels through a drainage path P1 that follows a route (which may be non-linear, and not therefore the most direct drainage path possible) through the structure 200 in the direction D1. Although in this embodiment, the drainage path may be relative tortuous, other embodiments for the drainage path may be a direct and relative linear (straight) path across the structure. In this embodiment, the relatively large cell size of the hexagonal cells 201 allows for moisture to drain relatively quickly though the structure in the direction D1.

Figure 3:
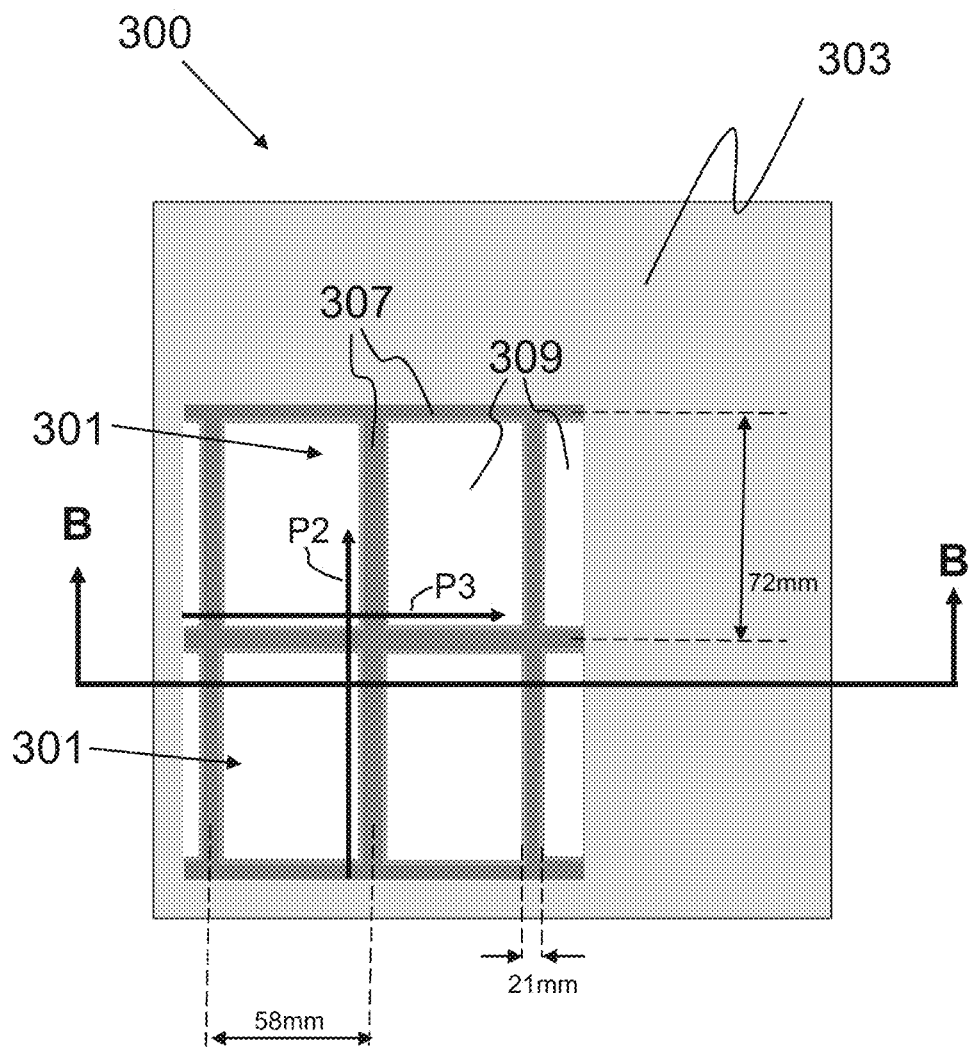
FIG. 3 shows a core structure according to a second embodiment of the invention.

FIG. 3 shows a core structure according to a second embodiment of the invention. The core structure 300 consists of a plurality of quadrilateral prism-shaped cells 301. The walls that make up the cells of the core structure 300 are made of laminated fibre reinforced composite. The fibre-reinforced composite was made using dry sheets of material, said sheets primarily being formed of carbon fibres. The carbon fibre sheets are then cured using a wet lay-up resin, for example an epoxy based resin. The cells have a cell size of 58 mm×72 mm. The fibre reinforced composite, and thus the cell walls 307 have a thickness of 3 mm, the fibre reinforced composite comprising 8 layers of carbon fibre bonded on top of each other (not shown) in order to build up the quadrilateral prism shaped cells 301. The first skin 303 and second skin 305 are formed of the same fibre reinforced composite (carbon fibre based reinforced composite) compared to the fibre reinforced composite used for the plurality of core cells.

Figure 4:
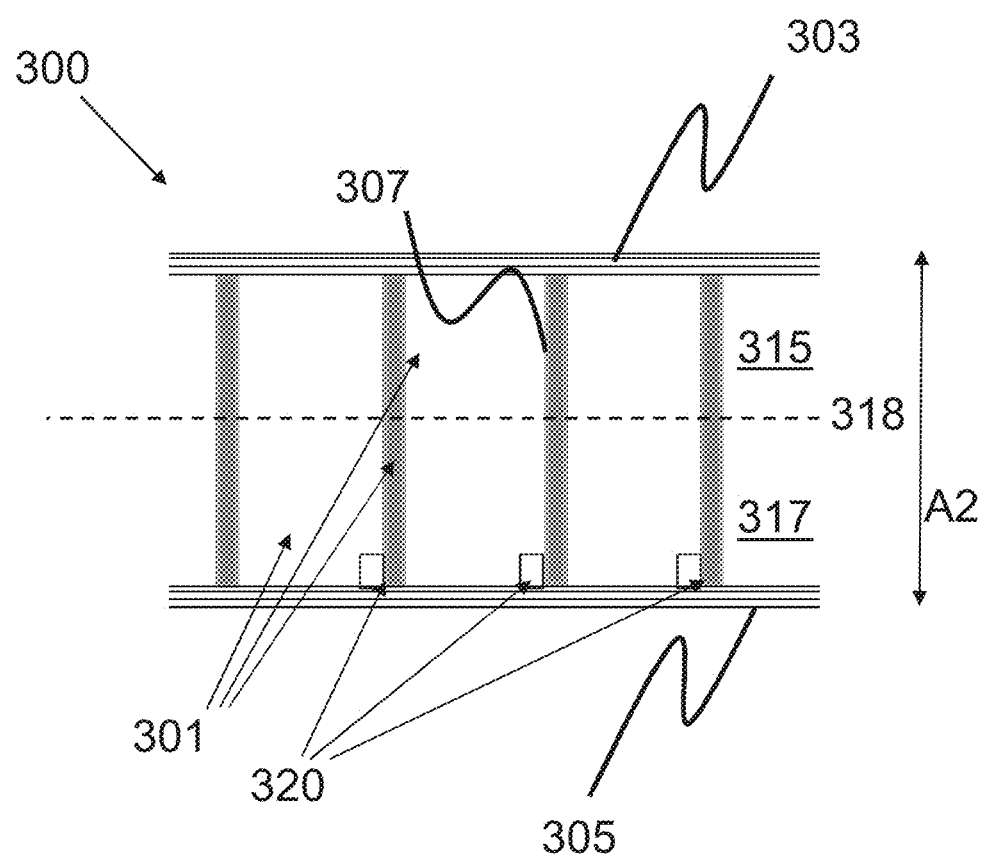
FIG. 4 shows a cross sectional view of the core structure, through the section B shown in FIG. 3.

FIG. 4 shows a schematic cross sectional view of the core structure 300, through the section B shown in FIG. 3. The first skin 303 is co-cured with the laminate material along a first half 315 of the core cells 301 respectively. The second skin 305 is co-cured with the laminate material along a second half 317 of the core cells 301 respectively. This means that the first skin 303 and second skin 305 are bonded to the core cells 301 without the need for any additional adhesive layers of the like. The height of the core structure along the cell axis A2 is 250 mm.

Co-curing of the core structure 300 in two halves in this way has a number of advantages. It allows the cells 301 to be cured strongly to the first skin 303 and second skin 305 without the need for additional adhesive layers. Moreover, when cured in this way, initially the voids 309 are open. This makes it easier to remove any lay-up structures (not shown) used in forming the core cells. In addition, it allows for any excess resin to be drained quickly before/during curing, especially if a wet lay-up method is used. The first co-curing can be performed using out of autoclave technology. The first half and second half are then joined in order to form the completed core structure. This is shown in more detail in FIG. 5a.

The structure comprises a plurality of drain holes 320. The drain holes 320 are aligned at the corners of each cell 301 such that straight drainage paths P2, P3 are formed that are orthogonal to each other. Drainage paths P2, P3 have the same length as the width and length of the panel respectively. Drainage paths P2, P3 are arranged to run in a direction parallel to the plane of both the first skin 303 and second skin 305, and allows fluid to flow along drainage paths P2, P3 in directions that are perpendicular to the cell axis A2. Drainage paths P2, P3 are slightly displaced to each corner of the plurality of cells 301.

As a result, P2 and P3 are straight drainage paths that give moisture that has entered into the core structure 320 a relatively short and direct route to the edge of core structure 320, where it can leave the core structure 300. This allows for a less tortuous drainage path than those that are provided by hexagonal cell arrangements, such as those shown in FIG. 2. This allows water to drain from the core structure more easily as it can take a direct path to the edge of the core structure, where it can be released. Pooling of moisture can also be reduced. The drain holes are also manufactured to be relatively large, and have a bore diameter of 10 mm. This further improves the drain-ability of the core cell structure, as holes with a relatively large diameter allow for a larger flow rate of fluid. In this embodiment the drainage holes 320 are formed by drilling through the cells walls 209 after the cells walls 207 have been cured. This improved drainage helps to solve the de-bonding and delamination problem caused by water accumulation and freezing, allowing less repairs and replacements with significant cost reductions over the Aircraft life cycle cost (LCC).

In addition the cells being large allow the panel to have much lower torsional to bending stiffness ratios relative to a hex honeycomb core. This makes the core structure 300 particularly suited for mechanised door or bay openings or the like, as the increased torsional malleability allows the core structure 300 to be mechanically warped slightly around openings, ensure the closure of said openings. Maintaining the high bending stiffness ensures that the core structure 300 does not fail when subjected to high force situations, e.g. when exposed to strong airflow. It also allows the core structure 300 to have a high strength to weight ratio. Such a core structure 300 has a lower torsion stiffness to bending stiffness ratio. The core structure when used as part of a main landing gear door is described in FIG. 6.

FIG. 5a shows a close up of the cell wall 307 at an interface 318 between the first half 315 and second half 317 of the core structure 300. The second half 317 has a male connector 319 that can be placed into the female connector 321. In this embodiment, the male connector 319 is lateral projection of the core cell walls 307 of the second half 317. The female connector 321 is a recess in the cell walls 307 of the first half 315. It enables the two halves to be secured together with a push-fit. This allows for quicker manufacturing, and also allows for easy access to the interior of the voids 309 such that the core structure can be repaired after assembly. Note that the male-female interface is shown in this figure is of a schematic nature only, and the skilled person would understand that a number of different male-female connectors can be used at interface 318. While in this embodiment of the invention the plurality of cells are split into a first half 215 and second half 317 along axis A2, other embodiments where the plurality of cells are not sit split in half along a centre plane, but are split into, for example a first part which extends a quarter of the length of axis A2, and a second part which extends the remaining three quarters along the axis A2. The male connector 319 and the female connector 321 have adhesive applied to them, such that the first half 315 and second half 317 can be co-bonded together. In this embodiment the co-bonding occurs with both the first half 315 and second half 317 pre-cured. The male connector 319 will typically need to be at least 1.0 mm thick in order for it to have sufficient structural strength and rigidity to perform its function. As such, there may be at least two layers of ply forming the male connector 319. The female connector 321 similar needs to have sufficient structural strength which may require the female connector 321 to be of formed multiple layers of material either side of the male connector 319. This may be achieved with some local add-up on the female connector 321.

FIG. 5b shows the cell wall 407 of a core structure 400 of a further embodiment of the invention. This embodiment of the invention is the same as that shown in FIG. 4 and FIG. 5a, but show a different method of forming the cell walls 407. The further embodiment shown in FIG. 5b is substantially the similar to that of the second embodiment, and only differences will now be described—corresponding reference numerals are used for corresponding parts of the embodiments, in the format '4XX' instead of '3XX' (for example, the cell walls are denoted 407 rather than 307). The core structure 400 is formed of a first skin 403 and a second skin 405. The first skin 403 is formed of two inner pieces of laminated material (403a, 403b) and an outer piece of laminated material 403c. The second skin 405 is formed of two inner pieces of laminated material (405a, 405b) and an outer piece of laminated material 405c. Each inner piece of laminated material (403a, 403b, 405a, 405b) comprises at least three plies of laminate material (other plies of material form the outer layer 403c, 405c). The three plies of material are 'peeled' from the outer layers (403c, 405c) of material of the first skin 403 and second skin 405 and bent upwards through an angle of approximately 90 degrees in order to form the first half 415 and second half 417 of the core cells. The first half 415 and second half 417 are thus each six plies thick. The male connector 419 is formed from removing the outer 4 plies of the second half 417, such that the inner two plies remain. The female connector 421 is formed from removing the inner two plies of the first half 415, such that the outer four plies remain. Thus, the cell walls 407 are curved plies that have been peeled from the first skin 403 and second skin 405, such that they extend roughly 90 degrees from the first skin 403 and second skin 405.

After the bending/peeling has taken place, the first half 415 and second half 417 are cured. Then, the male connector 419 and female connector 421 are placed in contact with each other and the halves (415, 417) are co-cured (in a second curing cycle) to form the complete core structure 400.

Figure 6A:
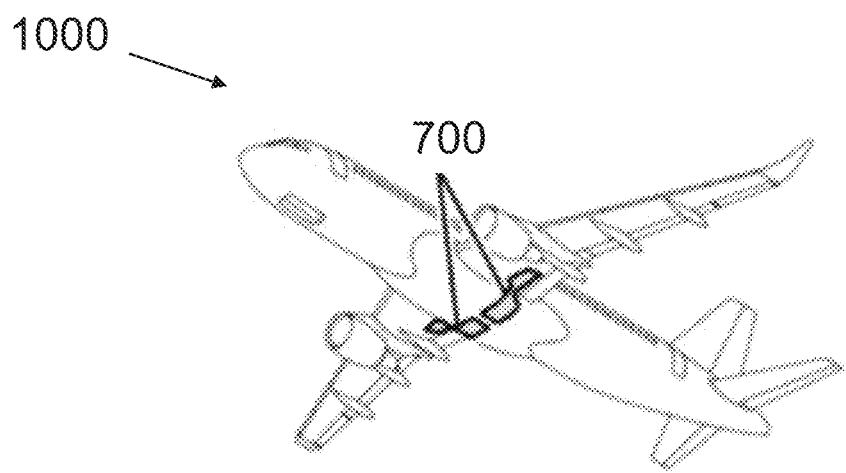
FIG. 6a shows an aircraft having a main landing gear assembly, comprising a main landing gear assembly having a panel in accordance with a third embodiment of the invention.

FIG. 6a shows an aircraft 1000 having a main landing gear assembly 700, the doors and fairings of which are pointed to in the figure (the landing gear itself not being deployed from the assembly).

Figure 6B:
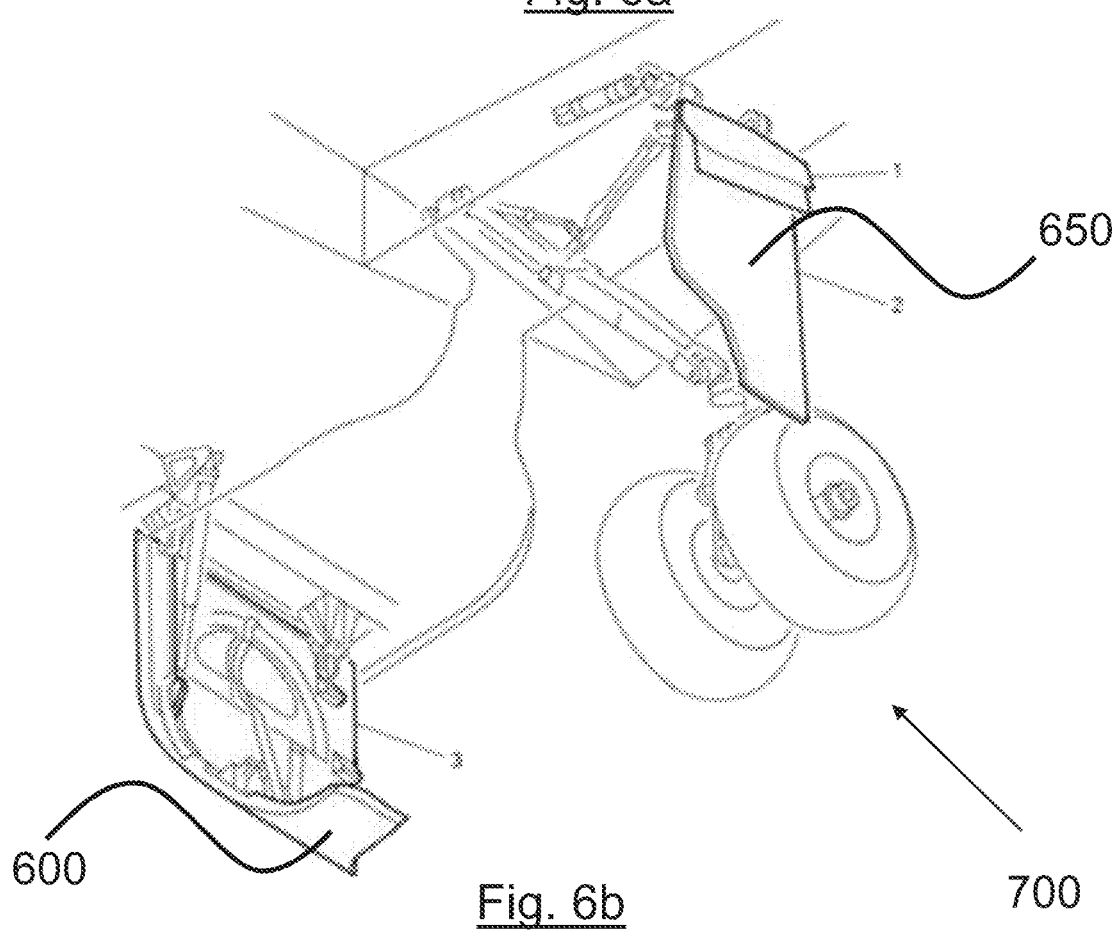
FIG. 6b shows a diagram of the main landing gear assembly of the aircraft of FIG. 6a, where the main leg fairing and door panel are in accordance with a third embodiment of the invention.

FIG. 6b shows a close-up of the landing gear assembly 700. The landing gear assembly 700 comprising a door panel 600 in accordance with a third embodiment of the invention. The door panel 600 is made of a core structure as described in any previous embodiments described in the application. The door panel 600 has a double curvature shape. As the door panel 600 has the improved torsion to bending stiffness ratio provided by the core structures described herein, the landing gear assembly 700 can forego any rigging and rely solely on an edge-seal sitting where the door panel 600 meets the opening (not shown) of the landing gear assembly 700. The relatively low torsional stiffness allows for larger panel displacements of the door—it can accept more torsion and thus this removes the need for flushing adjustments at the opening (stops, pads, etc.), as well as improved strength to weight ratios. The thickness of the door panel (from inner skin to outer skin) is about 200 mm. Its area is about 5 m$^2$. Also shown is main leg fairing 650. The main leg fairing 650 is made of a core structure as described in any previous embodiments described in the application, and enjoys similar advantages compared to leg fairings of the prior art, to the advantages described in relation to the door panel 600 (e.g. allowing for larger panel displacement, improve strength to weight ratio).

Figure 7:
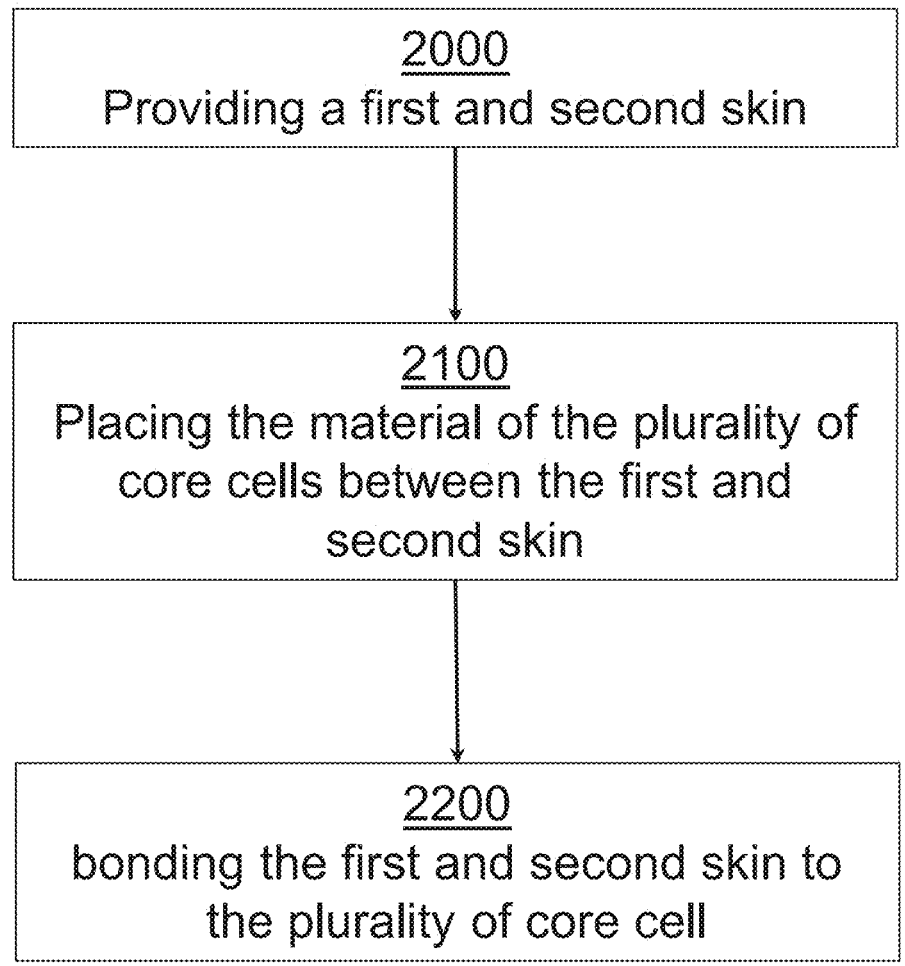
FIG. 7 is a flow diagram of a method of forming a core structure, the method being in accordance with a fourth embodiment of the invention.

FIG. 7 is a schematic representation of a method of forming a core structure, the method being in accordance with a fourth embodiment of the invention. The panel thus formed is in accordance with the first embodiment of the invention, wherein the cell walls of the structure so formed at themselves formed as multi-ply composite material sheets. The method includes the steps of providing 2000 a first and second skin; placing the material of the plurality of core cells between the first and second skin in such a way that bonding 2200 of the first and second skin to the plurality of core cells can be performed. Said bonding occurs through the use of adhesive layers (not shown) which are placed between the first skin and the material which forms the core structures, and the second skin and the material which forms the core structures.

Figure 8:
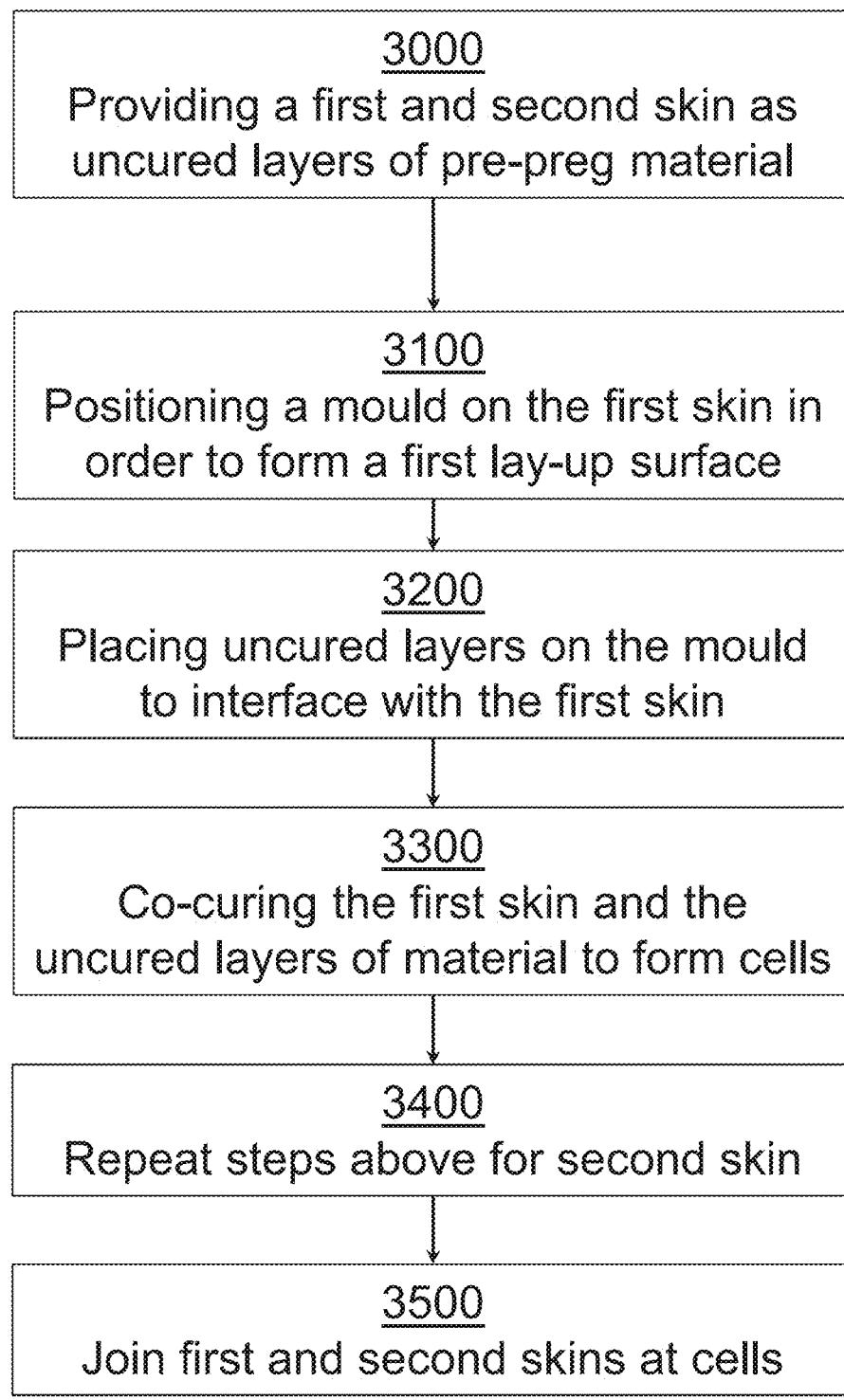
FIG. 8 is a flow diagram illustrating a method of forming a core structure, the method being in accordance with a fifth embodiment of the invention.

FIG. 8 is a schematic representation of a method of forming a core structure, the method being in accordance with a fifth embodiment of the invention. The panel thus formed is that in accordance with the second embodiment of the invention, in which the structure is formed of two halves (each having an array of open-faced half-cells) which are then joined to each other to form an array of closed cells (with integrated drainage channels). The method comprises the following steps:

Providing 3000 a first and second skin as uncured layers of pre-impregnated material;

Positioning 3100 a mould on the first skin in order to form a lay-up surface. The lay-up surface supports the uncured layers of pre-preg material, and also provides an area on which further uncured layers can be placed in an orientation that is substantially perpendicular to the first skin.

Placing 3200 uncured layers of pre-impregnated material on the mould to interface with the first skin;

Co-curing 3300 the first skin and the uncured layers of material to form a plurality of cells on the first skin, the plurality of cells having voids, and being open at an end of the cell distal to the end of the cell bonded to the first skin, the step of forming a plurality of cells on the first skin includes the step of bending (or otherwise 'peeling') the first skin in order to form layers of material that extend substantially perpendicularly away from the first skin. It will be understood that any moulds are removed prior to the co-curing 3300;

Repeating 3400 the steps above for a second skin in order to form cells on the second skin.

Joining 3500 the first and second skins at the open ends of their cells in order to form a closed cell structure between the first and second skins. In this embodiment the joining is performed by co-bonding the first and second skins.

The plurality of cells on the first and/or second skin are cured prior to the step of joining 3500 the first and second skins at the open ends of their cells in order to form a closed cell structure. This helps form a male connector on the plurality of cells of the first skin and a female connector on the plurality of cells of the second skin. The male connector and female connector are then interfaced prior to the co-bonding of the first and second skins to form a closed cell structure.

The bending of the layers occurs prior to curing (or co-curing) of the first and/or second skin. The layers are bent upwards and supported by a mould before any curing or co-curing takes place. In some embodiments of the invention, the bending may include cutting and or stitching the layers of material to form laminate material in the shape of the plurality of cells.

Figure 9:
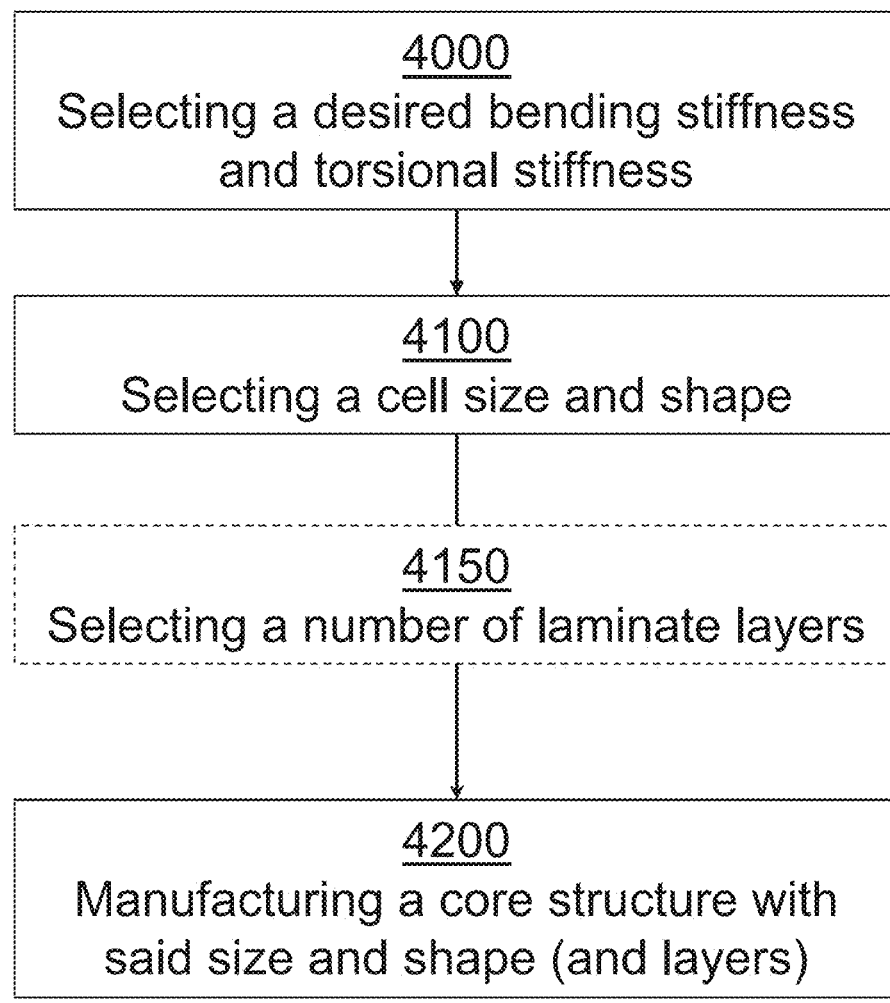
FIG. 9 is a flow diagram illustrating a method of forming a core structure according to a sixth embodiment of the invention.

FIG. 9 is a schematic representation of a method of forming a core structure according to a sixth embodiment of the invention. This method of forming a core structure can incorporate any of the features of the fourth and fifth embodiments of the invention, and only differences from said embodiments will be described hereafter. The method comprises the steps of:

Selecting 4000 a desired bending stiffness and torsional stiffness;

Selecting 4100 a cell size and shape which would result in the desired bending stiffness and torsional stiffness;

If the walls of the plurality of core cells are themselves made of laminate material, selecting 4150 a number of laminate layers.

Manufacturing 4200 a core structure with said size and shape (and number of layers).

The layers of material that form the walls of the cells of the structure may be laid up in alternating layers of fibre orientation, e.g. +45 degrees followed by −45 degrees.

Whilst the present invention has been described and illustrated with reference to particular embodiments, it will be appreciated by those of ordinary skill in the art that the invention lends itself to many different variations not specifically illustrated. By way of example only, certain possible variations will now be described.

The resin used in the composites described in the first and second embodiments is epoxy resin. However, the skilled person would appreciate that other thermoset or thermoplastic polymers, such as polyester, vinyl ester, or nylon may be used instead, if appropriate to do so.

In the first and second embodiments, the core material used is a laminated composite material such as glass fibre reinforced composites and carbon fibre reinforced composites. Other alternative reinforced composites could be used and include basalt based fibre composites for example. Aramid fibre based composites, such as Nomex® may be equally employed in embodiments of the invention, whether a square, hexagonal, or other configuration are employed. Such embodiments could for example equally benefit from mechanical properties which maintain bending stiffness and reduce torsional stiffness. Applying the configuration and/or engineering principles of the above embodiments to a Nomex® core may also allow for improved drainage properties.

In addition, in yet further embodiments of the invention, the first and second skin of the core structure may be formed of metal, such as aluminium foil, and or laminates of titanium alloy, for example. The first and second skin may also include hard wearing surface layers, which include paint or enamelling, for example—these hard wearing layers would be conventional in nature and known to the skilled person. The plurality of core cells may also comprise metal or metal composites.

The panels of the second and third embodiments, the cells are described as having cell sizes of 42 mm and 58 mm respectively. However it is appreciated that the improved mechanical properties of some embodiments of the invention can be achieved with a cell size as low as 10 mm. Larger cells sizes may provide advantages in other applications, with some embodiments having cell sizes up to, say, 500 mm. The wall thickness in applications with larger cells sizes may be as thick as, say, 50 mm.

While the drainage paths described in accordance with the third embodiment are orthogonal to each other, it is within the scope of the invention for other arrangements of substantially straight drainage paths to be incorporated into the structure. For example, the plurality of cells may be made up of a number of tessellating triangular prisms, which form a plurality of straight drainage paths that are at non-orthogonal orientations to each other. It should also be understood that a "straight" drainage path (e.g. such as the drainage path described and shown in the second embodiment) refers to a drainage path which does not take a meandering or tortuous path (such as the drainage path described and shown in the first embodiment, which is not considered to be straight or linear), and does not mean a mathematically perfectly straight path; the skilled person would understand this to include paths which have relatively minor levels of curvature and/or deviation from a mathematically straight path. The drainage holes may relative large, and may scale with the cell size. Drainage holes having a hole-size of significantly greater than 10 mm may be possible in certain embodiments.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A core structure for a composite panel for an aircraft, the core structure comprising:
    a first skin,
    a second skin, and
    an assembly of core cells, wherein each core cell of the assembly extends between the first skin and the second skin, wherein each of the core cells includes:
        at least one cell wall, extending parallel to a cell axis that is perpendicular to the first skin and second skin,
        a cell void surrounded by the at least one cell wall, and
        a drainage hole in the at least one cell wall, wherein the drainage hole is adjacent to the first skin,
    wherein the drainage holes in the cell walls form a direct drainage path along an interior surface of the first skin,
    wherein the direct drainage path extends through the assembly of core cells to an edge of the assembly between the first skin and the second skin,
    wherein the assembly of the core cells includes a first sheet of first partial core cells stacked with and reversibly joined with a second sheet of second partial core cells,
    wherein each of the first and second partial core cells includes at least one partial cell wall extending parallel to the cell axis, and each of the first and second partial core cells includes a void around which extends the at least one cell partial wall;
    wherein for each of the core cells, the at least one cell wall includes the at least one partial cell wall of the first partial core cell corresponding to the core cell and the at least one partial cell wall of the second partial core cell corresponding to the core cell;
    wherein each of the core cells is a stack of a corresponding one of the first partial core cells and a corresponding one of the second partial cores;
    wherein for each of the core cells, the cell void extends continuously through the core cell from the first skin to the second skin and the cell void is a combination of the void for the corresponding first partial core cell and the void for the corresponding second partial core cell;
    wherein a plurality of the first partial core cells each includes a male connector and a plurality of the second partial core cells each includes a female connector, and
    the plurality of the first partial core cells and the plurality of the second partial core cells are stacked to form a plurality of the core cells each including a male-female connection between corresponding ones of the first partial core cells and ones of the second partial core cells.

2. The core structure of claim 1, wherein the assembly of core cells of the core structure are aligned such that the drainage path formed by the core cells is a straight line.

3. The core structure of claim 1, wherein the drainage path has a path length from a start of the drainage path to an end of the drainage path which is a straight line.

4. The core structure of claim 1, wherein the core structure has a length and a width, and wherein the drainage path has a length substantially equal to the length or the width of the core structure.

5. The core structure of claim 1, wherein the at least one cell wall for each of the core cells includes four cell walls, said four cell walls arranged to form a prism having a quadrilateral base.

6. The core structure of claim 1, wherein the at least cell wall for each of the core cells has a length greater than 40 mm.

7. The core structure of claim 1, wherein the at least one of the cell wall for each of the core cells has a thickness greater than 3 mm.

8. The core structure of claim 1, wherein
    the at least one cell wall in each of the core cells comprises a laminated composite material, and
    the at least one cell wall in each of the core cells has a height parallel to the cell axis, a length and a wall thickness, and
    the laminated composite material comprises layers of composite material.

9. The core structure of claim 8, wherein the laminated composite material comprises at least five (5) layers.

10. The core structure of claim 1, wherein the first skin and the second skin each have a thickness and each comprise a laminated composite material, and
    wherein the laminated composite material comprises a plurality of layers of composite material.

11. The core structure of claim 1, wherein the height of the core structure along the cell axis is in a range of 50 mm to 250 mm.

12. The core structure of claim 1, wherein the assembly of the core cells comprise a material formed of aromatic polyamide-aramid-fibres and epoxy resin.

13. The core structure of claim 1, wherein the male-female connector is configured such that the first partial core cells are reversibly mounted to the second partial core cells via a push fit configuration.

14. A structural panel for an aircraft comprising the core structure of claim 1.

15. A structural panel for the aircraft of claim 14, wherein the structural panel is a landing gear bay door for attachment to a main landing gear of an aircraft.

16. A sub-assembly of an aircraft comprising the structural panel of claim 14.

17. An aircraft comprising the structural panel of claim 14.

18. The core structure of claim 1, wherein the drainage hole through the at least one cell wall is open along an edge of the at least one cell wall abutting the first skin, such that the first skin forms an edge of the drainage hole.

19. The core structure of claim 1, wherein the drainage hole is a first drainage hole;
   wherein each of the core cells includes a second drainage hole adjacent to the first skin,
   wherein the at least one cell wall is at least a first cell wall and a second cell wall separated from the first cell wall by a corner extending parallel to the cell axis,
   wherein the first drainage hole in each of the first cell wall is adjacent to the corner, and
   wherein the second drainage holes in the second cell wall is adjacent to the corner.

20. The core structure of claim 1, wherein the first partial core cells are each formed of plies and the second partial core cells are each formed of plies, and
   wherein each of the male connectors includes a ply of the plies forming the first partial core cell, each of the female connectors includes a pair of adjacent plies forming the second partial core cell, and the ply of the male connector is configured to be inserted between the pair of plies of the female connector.

* * * * *